United States Patent
Cardona

(10) Patent No.: US 12,066,973 B2
(45) Date of Patent: Aug. 20, 2024

(54) USERSPACE NETWORKING WITH REMOTE DIRECT MEMORY ACCESS

(71) Applicant: Microsoft Technology Licensing, LLC, Redmond, WA (US)

(72) Inventor: Omar Cardona, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/339,245

(22) Filed: Jun. 4, 2021

(65) Prior Publication Data

US 2022/0391348 A1 Dec. 8, 2022

(51) Int. Cl.
*G06F 15/173* (2006.01)
*G06F 21/44* (2013.01)
*H04L 12/06* (2006.01)

(52) U.S. Cl.
CPC ........ *G06F 15/17331* (2013.01); *G06F 21/44* (2013.01); *H04L 12/06* (2013.01)

(58) Field of Classification Search
CPC ..... G06F 15/17331; G06F 21/44; H04L 12/06
See application file for complete search history.

(56) References Cited

U.S. PATENT DOCUMENTS

| | | | |
|---|---|---|---|
| 7,990,994 B1 * | 8/2011 | Yeh | H04L 12/4641 711/147 |
| 8,489,778 B2 * | 7/2013 | Sharp | G06F 13/385 709/227 |
| 10,936,522 B1 * | 3/2021 | Iqbal | G06F 13/4027 |
| 10,999,219 B1 * | 5/2021 | Athreyapurapu | H04L 41/0806 |

(Continued)

FOREIGN PATENT DOCUMENTS

| | | | | |
|---|---|---|---|---|
| WO | 2021041444 A1 | 3/2021 | | |
| WO | WO-2021041444 A1 * | 3/2021 | ......... | G06F 12/0284 |

OTHER PUBLICATIONS

"AF_XDP", Retrieved from: https://www.kernel.org/doc/html/latest/networking/af_xdp.html, Retrieved on: Jun. 1, 2021, 8 Pages.

(Continued)

*Primary Examiner* — David P Zarka
*Assistant Examiner* — Wuji Chen
(74) *Attorney, Agent, or Firm* — Newport IP, LLC; Jacob P. Rohwer

(57) ABSTRACT

A computer system that includes at least one host device comprising at least one processor. The at least one processor is configured to implement, in a host operating system (OS) space, a teamed network interface card (NIC) software program that provides a unified interface to host OS space upper layer protocols including at least a remote direct memory access (RDMA) protocol and an Ethernet protocol. The teamed NIC software program provides multiplexing for at least two data pathways. The at least two data pathways include an RDMA data pathway that transmits communications to and from an RDMA interface of a physical NIC, and an Ethernet data pathway that transmits communications to and from an Ethernet interface of the physical NIC through a virtual switch that is implemented in a host user space and a virtual NIC that is implemented in the host OS space.

19 Claims, 7 Drawing Sheets

(56) References Cited

U.S. PATENT DOCUMENTS

| | | | | |
|---|---|---|---|---|
| 2004/0010612 | A1* | 1/2004 | Pandya | H04L 69/166 709/213 |
| 2005/0120160 | A1* | 6/2005 | Plouffe | G06F 9/505 711/1 |
| 2007/0297334 | A1* | 12/2007 | Pong | H04L 69/162 370/235 |
| 2009/0204723 | A1* | 8/2009 | Tonsing | H04L 12/5602 709/238 |
| 2012/0254863 | A1* | 10/2012 | Baratakke | H04L 69/32 718/1 |
| 2012/0311063 | A1* | 12/2012 | Sharp | G06F 13/385 709/212 |
| 2012/0324442 | A1* | 12/2012 | Barde | G06F 9/45558 718/1 |
| 2015/0095443 | A1* | 4/2015 | Yang | G06F 9/45558 709/212 |
| 2015/0222533 | A1* | 8/2015 | Birrittella | H04L 45/66 370/392 |
| 2015/0280972 | A1* | 10/2015 | Sivan | H04L 41/0668 370/225 |
| 2016/0188527 | A1* | 6/2016 | Cherian | H04L 41/12 709/212 |
| 2016/0248628 | A1* | 8/2016 | Pandit | H04L 67/1097 |
| 2016/0269305 | A1* | 9/2016 | Sreeramoju | H04L 47/30 |
| 2017/0168986 | A1* | 6/2017 | Sajeepa | G06F 15/17331 |
| 2017/0206169 | A1* | 7/2017 | Coppola | G06F 9/44505 |
| 2017/0351639 | A1* | 12/2017 | Borikar | G06F 15/17331 |
| 2017/0371835 | A1* | 12/2017 | Ranadive | G06F 9/544 |
| 2018/0188974 | A1* | 7/2018 | Cayton | G06F 3/0683 |
| 2018/0357086 | A1* | 12/2018 | Kinsella | G06F 9/45558 |
| 2019/0114196 | A1* | 4/2019 | Aggarwal | G06F 9/4856 |
| 2019/0196994 | A1* | 6/2019 | Mitra | G06F 3/0683 |
| 2019/0303345 | A1* | 10/2019 | Zhu | H04L 67/1097 |
| 2020/0089648 | A1* | 3/2020 | Klein | G06F 3/0607 |
| 2020/0125529 | A1* | 4/2020 | Byers | G06F 13/28 |
| 2020/0213246 | A1* | 7/2020 | Pan | G06F 15/17331 |
| 2020/0293465 | A1* | 9/2020 | Yang | H04L 49/70 |
| 2020/0319812 | A1* | 10/2020 | He | G06F 3/0604 |
| 2020/0403940 | A1* | 12/2020 | Daly | G06F 12/0868 |
| 2021/0081352 | A1* | 3/2021 | Yang | G06F 13/1668 |
| 2021/0103403 | A1* | 4/2021 | He | G06F 3/0664 |
| 2021/0117249 | A1* | 4/2021 | Doshi | H04L 67/1001 |
| 2021/0144094 | A1* | 5/2021 | Limaye | H04L 47/125 |
| 2021/0216488 | A1* | 7/2021 | Zhang | G06F 3/067 |
| 2021/0359955 | A1* | 11/2021 | Musleh | H04L 47/11 |
| 2021/0382846 | A1* | 12/2021 | Miller | G06F 9/52 |
| 2022/0103359 | A1* | 3/2022 | Zheng | G06F 9/545 |
| 2022/0103460 | A1* | 3/2022 | Yu | H04L 45/64 |
| 2022/0138021 | A1* | 5/2022 | Rimmer | G06F 9/5083 718/105 |
| 2022/0174005 | A1* | 6/2022 | Limaye | H04L 45/60 |
| 2022/0214912 | A1* | 7/2022 | Julien | G06F 9/505 |

OTHER PUBLICATIONS

"Amazon: AWS Nitro System", Retrieved from: https://aws.amazon.com/ec2/nitro/, Retrieved on: Jun. 1, 2021, 5 Pages.
"DPDK", Retrieved from: https://www.dpdk.org/, Retrieved on: Jun. 1, 2021, 2 Pages.
"DPDK: Architecture Overview", Retrieved from: https://doc.dpdk.org/guides/prog_guide/overview.html, Retrieved on: Jun. 1, 2021, 3 Pages.
"Poll Mode Driver", Retrieved from: https://doc.dpdk.org/guides/prog_guide/poll_mode_drv.html, Retrieved on: Jun. 1, 2021, 9 Pages.
"Infiniband", Retrieved From: https://en.wikipedia.org/wiki/InfiniBand#:~: text=InfiniBand%20(IB)%20is%20a%20computer,both%20among%20and%20within%20computers., Retrieved on: Jun. 1, 2021, 4 Pages.
"KLOC", Retrieved from: https://en.wiktionary.org/wiki/kloc, Retrieved on: Jun. 1, 2021, 1 Page.
Satran, et al., "AppContainer Isolation", Retrieved from: https://docs.microsoft.com/en-us/windows/win32/secauthz/appcontainer-isolation, May 31, 2018, 3 Pages.
"Meltdown and Spectre", Retrieved from: https://meltdownattack.com/, Retrieved on: Jun. 1, 2021, 5 Pages.
"Microsoft Windows Server", Retrieved from: https://www.microsoft.com/en-us/windows-server, Retrieved on: Jun. 1, 2021, 4 Pages.
"Microsoft Security Response Center", Retrieved from: https://www.microsoft.com/en-us/msrc, Retrieved on: Jun. 1, 2021, 1 Page.
"Network Virtualization", Retrieved from: https://en.wikipedia.org/wiki/Network_virtualization, Retrieved on: Jun. 1, 2021, 3 Pages.
"Open Fabric Alliance (OFA)", Retrieved from: https://www.openfabrics.org/, Retrieved on: Jun. 1, 2021, 2 Pages.
Whitney, et al., "SIMD Extension", Retrieved From: https://docs.microsoft.com/en-us/cpp/parallel/openmp/openmp-simd?view=msvc-160&viewFallbackFrom=vs-2019, Mar. 20, 2019, 3 Pages.
"RDMA Consortium", Retrieved from: http://www.rdmaconsortium.org/, Retrieved on: Jun. 1, 2021, 1 Page.
"RDMA over Converged Ethernet", Retrieved from: https://en.wikipedia.org/wiki/RDMA_over_Converged_Ethernet, Retrieved on: Jun. 1, 2021, 3 Pages.
"How Red Hat is Using DPDK", Retrieved from: https://www.dpdk.org/blog/2019/11/25/how-red-hat-is-using-dpdk/, Nov. 25, 2019, 4 Pages.
"Acceleration with the N-VDS in Enhanced Datapath Mode", Retrieved from: https://docs.vmware.com/en/VMware-vCloud-NFV-OpenStack-Edition/3.0/vmware-vcloud-nfv-openstack-edition-ra30/GUID-0695F86B-20AD-4BFB-94E0-5EAF94087758.html, May 31, 2019, 3 Pages.
"DPDK releases v19.05, introduces Windows Support!", Retrieved from: https://www.dpdk.org/blog/2019/07/15/dpdk-releases-v19-05-introduces-windows-support/, Jul. 15, 2019, 3 Pages.
Barak, Dotan, "The OFED package", Retrieved from: https://www.rdmamojo.com/2012/04/25/the-ofed-package/, Apr. 25, 2012, 7 Pages.
Beck, Motti, "How Microsoft Enhanced the Azure Cloud Efficiency", Retrieved from: https://blog.mellanox.com/2017/05/microsoft-enhanced-azure-cloud-efficiency/, May 19, 2017, 5 Pages.
Colyer, Adrian, "Andromeda: Performance, Isolation, and Velocity at Scale in Cloud Network Virtualization", Retrieved From: https://blog.acolyer.org/2018/05/02/andromeda-performance-isolation-and-velocity-at-scale-in-cloud-network-virtualization/, May 2, 2018, 7 Pages.
Firestone, et al., "Azure Accelerated Networking: SmartNICs in the Public Cloud", In Proceedings of 15th (USENIX) Symposium on Networked Systems Design and Implementation (NSDI), Apr. 9, 2018, pp. 51-64.
Giller, Robin, "Open vSwitch with DPDK Overview", Retrieved from: https://software.intel.com/content/www/us/en/develop/articles/open-vswitch-with-dpdk-overview.html, Sep. 27, 2016, 7 Pages.
Guo, et al., "RDMA over Commodity Ethernet at Scale", In Proceedings of the ACM SIGCOMM Conference, Aug. 22, 2016, 14 Pages.
Menon, et al., "Improving Security and Flexibility within Windows DPDK Networking Stacks", In Proceedings of DPDK Summit North America, Dec. 3, 2018, pp. 1-22.
Messer, et al., "Making Networking Apps Scream on Windows with DPDK", In Proceedings of DPDK Summit, Nov. 14, 2017, 19 Pages.
Robertson, et al.,"/DYNAMICBASE (Use address space layout randomization)", Retrieved from: https://docs.microsoft.com/en-us/cpp/build/reference/dynamicbase-use-address-space-layout-randomization?view=msvc-160&viewFallbackFrom=vs-2019, Jun. 12, 2018, 2 Pages.
Singhvi, et al., "1RMA: Re-envisioning Remote Memory Access for Multi-tenant Datacenters", In Proceedings of the Annual conference of the (ACM) Special Interest Group on Data Communication on the applications, technologies, architectures, and protocols for computer communication, Aug. 10, 2020, pp. 708-721.
Tu, et al., "Bringing the Power of eBPF to Open vSwitch", In Proceedings of the Linux Plumbers Conference, Nov. 13, 2018, pp. 1-45.

(56) References Cited

OTHER PUBLICATIONS

Zhu, et al., "Congestion Control for Large-Scale RDMA Deployments", In Proceedings of the ACM Conference on Special Interest Group on Data Communication (SIGCOMM), Aug. 17, 2015, pp. 523-536.

"Open vSwitch with DPDK", Retrieved From: https://docs.openvswitch.org/en/latest/intro/install/dpdk/, Retrieved on: Jun. 1, 2021, 10 Pages.

Marinescu, Dan C., "Virtual Machine Monitor", In Book Cloud Computing, May 27, 2013, 12 Pages.

Doyle, Lee, "What is NFV and what are its benefits", Retrieved From: https://www.networkworld.com/article/3253118/what-is-nfv-and-what-are-its-benefits.html, Feb. 6, 2018, 6 Pages.

"Internet Mix", Retrieved From: https://en.wikipedia.org/wiki/Internet_Mix, Retrieved on: Jun. 1, 2021, 1 Page.

Dalton, et al., "Andromeda: Performance, Isolation, and Velocity at Scale in Cloud Network Virtualization", In the Proceedings of the 15th USENIX Symposium on Networked Systems Design and Implementation, Apr. 9, 2018, pp. 373-387.

"Faster Switching via RDMA over ECP", An IP.com Prior Art Database Technical Disclosure, May 9, 2014, 9 Pages.

"International Search Report and Written Opinion Issued in PCT Application No. PCT/US22/028416", Mailed Date: Aug. 9, 2022, 14 Pages.

\* cited by examiner

USERSPACE NETWORKING WITH REMOTE DIRECT MEMORY ACCESS

BACKGROUND

Enterprises are increasingly moving toward hosting services and applications using cloud services. For many applications, a cloud and container architecture for cloud-based server hosting is used that requires properties such as high-throughput, latency-sensitivity, and endpoint scale density. These high-performance properties have become challenging to achieve with kernel space network virtualization solutions as the scale of the cloud-based server hosting has increased. A multitude of legacy software applications and redundant code bases that are executed in the kernel has built up over decades of operating system development to achieve broad applicability of the operating system itself in a variety of contexts. The large overhead caused by such legacy software can degrade the overall performance of the operating system kernel, which causes kernel space network virtualization implementation to suffer from diminishing performance advantages from the additional software that places ever greater burdens on the host processor. On the other hand, user space networking enables high-performance, secure, and reliable packet processing for modern datacenter workloads.

SUMMARY

A computer system is provided. The computer system may include at least one host device comprising at least one processor. The at least one processor may be configured to implement, in a host operating system (OS) space, a teamed network interface card (NIC) software program that provides a unified interface to host OS space upper layer protocols including at least a remote direct memory access (RDMA) protocol and an Ethernet protocol. The teamed NIC software program may provide multiplexing for at least two data pathways. The at least two data pathways may include an RDMA data pathway that transmits communications to and from an RDMA interface of a physical NIC, the RDMA data pathway being within the host OS space. The at least two data pathways may include an Ethernet data pathway that transmits communications to and from an Ethernet interface of the physical NIC through a virtual switch that is implemented in a host user space and a virtual NIC that is implemented in the host OS space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Cloud computing usage continues to grow as more enterprises have moved toward hosting their services and applications on cloud-based datacenters. Kernel space network virtualization encounters difficult challenges when used for cloud computing solutions. For example, kernel space network virtualization places greater burden on the host central processing units (CPUs), and has become cost prohibitive. Further, kernel space network virtualization faces network and data security challenges. For example, a guest user may potentially escape and land in global kernel address space, which may present a vulnerability that, in an extreme case, may be exploited to take over the host. Lastly, the kernel of the operating system has a large amount of overhead from decades of legacy software that has built up to achieve broad applicability goals that may degrade performance and increase servicing costs.

Due to these challenges, cloud computing has increasingly moved toward user space network virtualization, which enables high-performance, secure, and reliable packet processing for modern datacenter workloads. However, conventional implementations of user space network virtualization suffer from several drawbacks. For example, such implementations typically do not allow for user space network virtualization to participate in the same virtual fabric and coexist with kernel space remote direct memory access (RDMA). These user space network virtualization implementations typically do not address the RDMA over Converged Networking requirements, and do not have a notion of a Converged device. Thus, these user space network virtualization implementations typically preclude RDMA enablement and user space networking for the same host address space.

To address these issues, the following disclosure describes a server architecture for enabling both user space network virtualization and RDMA that does not need to co-locate the Ethernet device (e.g., the network interface card) of a compute node with the Transmission Control Protocol (TCP) and the Internet Protocol (IP) stack used to service incoming data packets, thus allowing for a user space Ethernet packet processing data pathway while simultaneously allowing for kernel space consumption of RDMA protocols.

Figure 1:
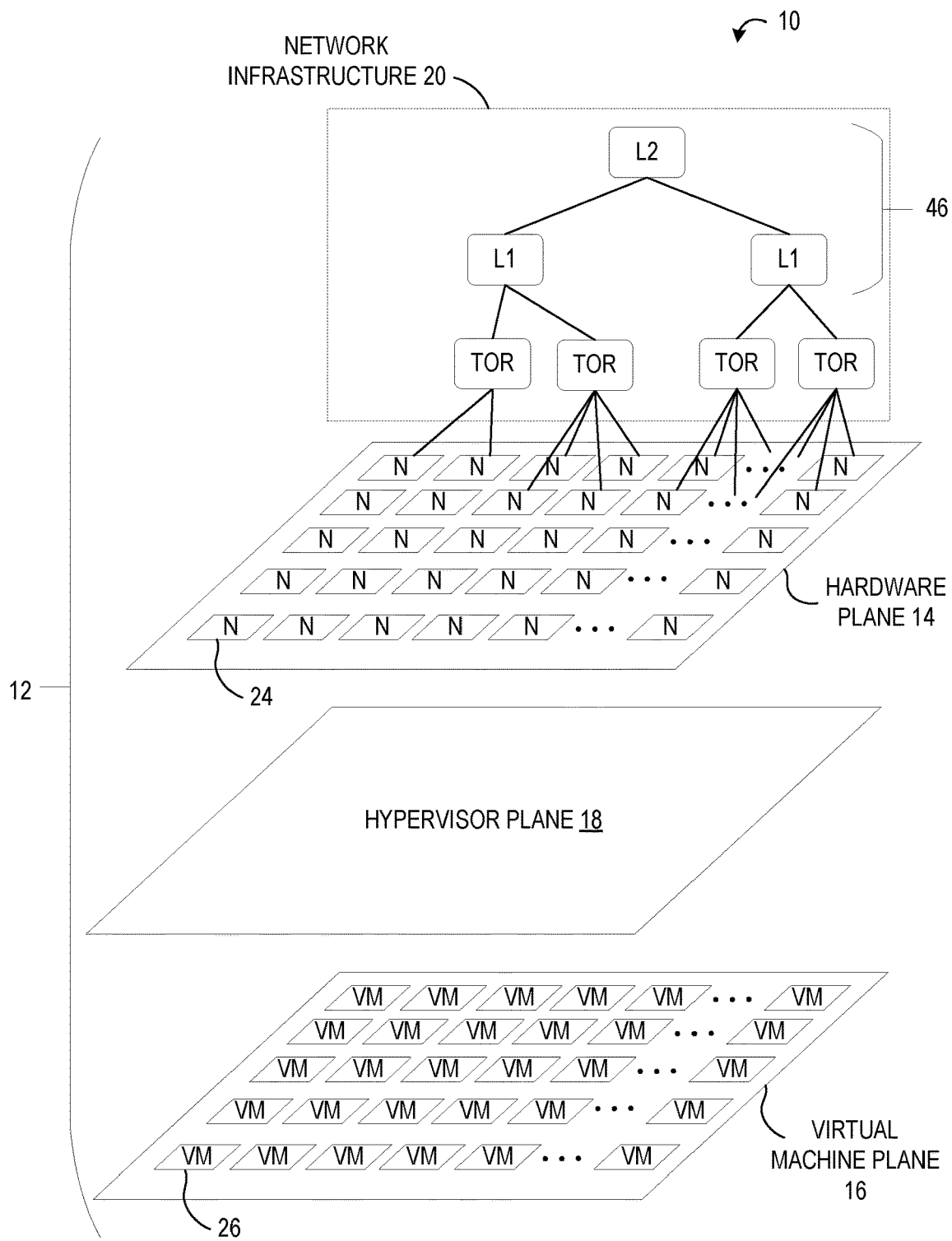
FIG. 1 is a schematic view that shows an example cloud platform that includes a plurality of host devices that enable both user space network virtualization and RDMA processes, according to one embodiment of the subject disclosure.

FIG. 1 illustrates a computer system 10 for a cloud platform 12 that may implement the server architecture described herein for enabling both user space network virtualization and RDMA. The computer system 10 includes a hardware plane 14, a virtual machine plane 16, a hypervisor plane 18, and network infrastructure 20 that are collectively configured to operate the cloud platform 12. The hardware plane 14 includes a collection of host devices 24 (each denoted by the symbol "N" for compute node in FIG. 1) that may include processors, graphics processing units (GPU), volatile memory, and other computer components configured to run a host operating system (OS). The host OS executed by the host devices 24 of the hardware plane 14 are configured to communicate with one or more hypervisors of the hypervisor plane 18. The one or more hypervisors of the hypervisor plane 18 may create, handle, and monitor a plurality of virtual machines 26 (each denoted by the symbol "VM" in FIG. 1) of the virtual machine plane 16. Through the hypervisor plane 18, each virtual machine 26 of the virtual machine plane 16 may be hosted and run by the hardware components of one or more host devices 24 of the hardware plane 14. In this manner, the plurality of virtual machines 26 of the virtual machine plane 16 may share virtualized hardware resources managed by the hypervisor plane 18. Each virtual machine 26 provides a simulated computer environment within which guest software, such as, for example, cloud applications may be executed.

Figure 2:
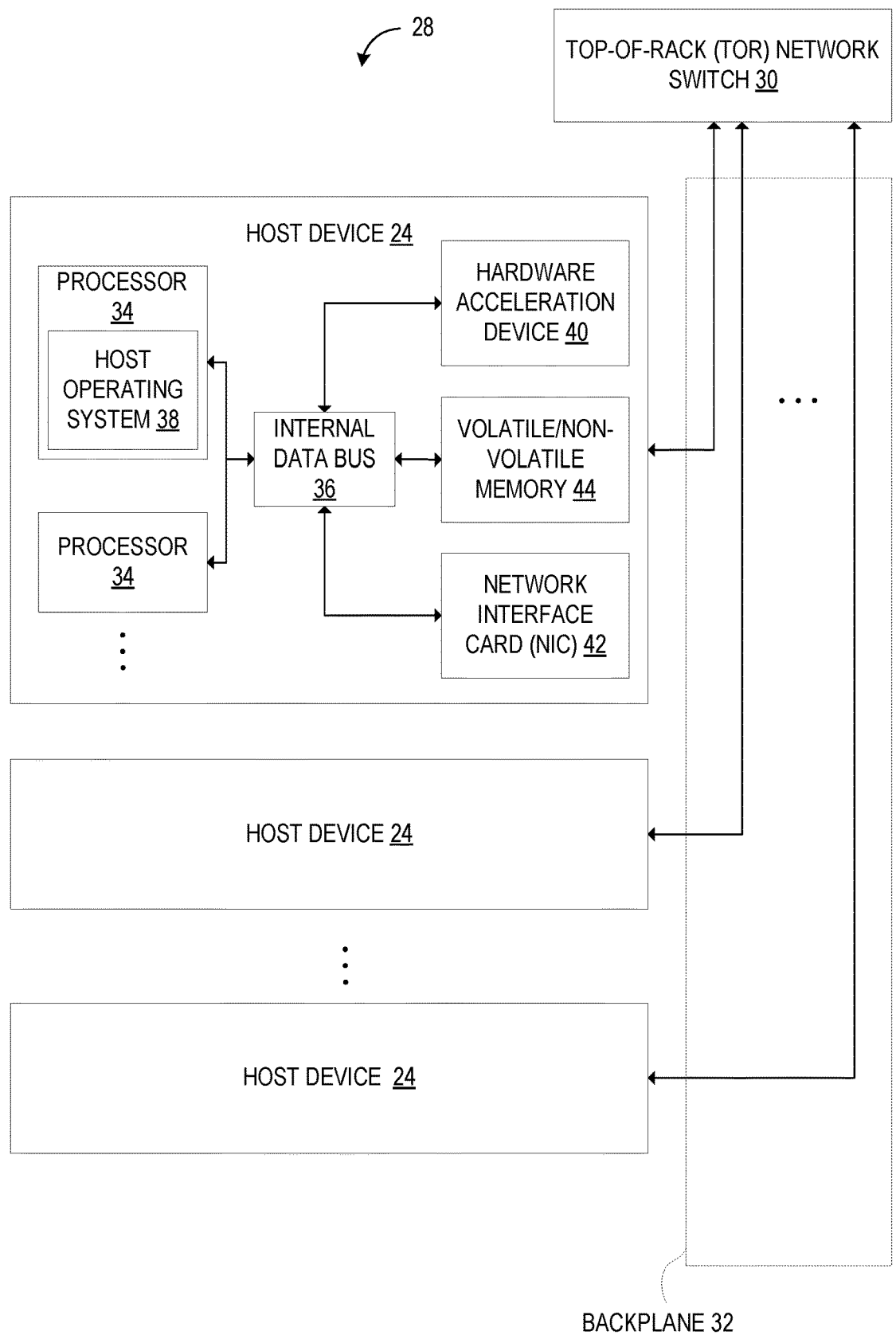
FIG. 2 is a schematic view that shows a host device cluster of the example cloud platform of FIG. 1.

In one example, the computer system 10 corresponds to a data center environment configured to operate the cloud platform 22 that communicatively couples the plurality of host devices 24 via standard network infrastructure. Turning to FIG. 2, the plurality of host devices 24 may be organized into a plurality of host device clusters 28. Each host device cluster 28 may include a top of rack (TOR) network switch 30, two or more host devices of the plurality of host devices 24, and a backplane 32 communicatively coupling the top of rack network switch 30 and host devices 24. For example, each host device cluster 28 may correspond to a server rack that provides physical structure, ventilation, etc., for a TOR switch 30 and a plurality of host devices 24 that are located physically proximate to each other in the same server rack. The backplane 32 communicatively coupling each host device in the server rack may facilitate a low latency and high bandwidth exchange of network packets between host devices in the same server rack. It should be appreciated that the host device cluster 28 shown in FIG. 2 is merely exemplary, and that the host devices 24 may be organized in any other suitable configuration in the computer system 10.

As illustrated in FIG. 2, each host device 24 in the host device cluster 28 includes at least one processor 34 communicatively coupled to other hardware components by an internal data bus 36. The at least one processor 34 may execute a host OS 38. As shown, each host device 24 may include more than one processor 34 that may each execute a separate host OS 38, or may collectively execute a single host OS. In one example, the internal data bus 36 may take the form of a Peripheral Component Interconnect Express (PCIe) link, for example. Data buses of other formats may alternatively be used. It should be appreciated that "internal" as used in the term "internal data bus" refers to the fact that at least a portion of the data bus is typically housed in the same housing (which serves as a Faraday cage) as the processor 34 of the host device 24, and should be understood to encompass a data bus that connects a processor of a host device in a housing with internally mounted hardware components and/or to externally coupled hardware components plugged into, e.g., a port on an external surface of the housing of the host device. As illustrated, each host device 24 may include other suitable hardware components, such as, for example, a hardware acceleration device 40 that may be used to provide hardware acceleration for applications or modules of the host OS 38, a physical network interface card (NIC) 42, volatile and non-volatile memory 44, etc. It should be appreciated that the host devices 24 are not limited to the illustrated hardware components, but may include any suitable configuration of hardware components configured for operating the cloud platform 12. Additionally, it should be appreciated that while the host devices 24 are illustrated as being clustered in a server rack configuration, other types of network infrastructure and housing configurations may be utilized to couple the plurality of host devices 24 and operate the cloud platform 12.

Turning back to FIG. 1, the network infrastructure 20 may include typical network infrastructure to couple the host devices 24 within a host device cluster together, such as server racks including TOR network switches. The computer system 10 may include a plurality of host device clusters that each have an associated TOR network switch, and may have the architecture described in FIG. 2. Network infrastructure 20 may further include higher-level switching infrastructure 46 (L1) and (L2) that connects the TOR network switches together. The higher-level switching infrastructure 46 may take the form of any suitable networking architecture, and may be driven by any suitable routing protocol(s). In the illustrated example, the higher-level infrastructure 46 includes a collection of aggregation switches L1 and core switches L2. However, it will be appreciated that the higher-level switching infrastructure may include any suitable number of levels of switches.

Each host OS 38 executed via processors 34 of the host devices 24 may communicate with other host server instances 38 through the network infrastructure 20. Additionally, the plurality of NICs 42 of the plurality of host devices 24 may include remote direct access memory (RDMA) capabilities that allow applications and modules running on the cloud platform 12 to directly access memory devices across the cloud platform 12 without passing through a host OS 38.

The collective host OSs 38 manages the collective hardware resources of the hardware plane 14, which may be utilized to run the virtual machines 26 of the virtual machine plane 16 through the hypervisor plane 18. In one example, the virtual machines 26 utilization of the hardware resources of host devices the hardware plane 14 is controlled by the hypervisor plane 18, and the virtual machines 26 may not directly access the host devices 24 themselves. The virtual machines 26 of the virtual machine plane 16 provide a virtual computing environment within which users of the cloud platform 22 may execute cloud applications. During execution of a cloud application, the hypervisor plane 18 may allocate hardware resources of one or more host devices 24 of the hardware plane 14 to run the cloud application. The hypervisor plane 18 may allocate the hardware resources of the host devices 24 in a changeable and scalable manner, such that additional host devices 24 may be allocated to a particular virtual machine 26, and already allocated host devices 24 may be reduced, transferred, or otherwise changed for that particular virtual machine 26 while the cloud application is running.

It should be appreciated that the cloud platform 12 infrastructure described above and illustrated in FIGS. 1 and 2 are merely exemplary, and that other networking infrastructures and organization methods not specifically described herein may also be utilized.

Figure 3:
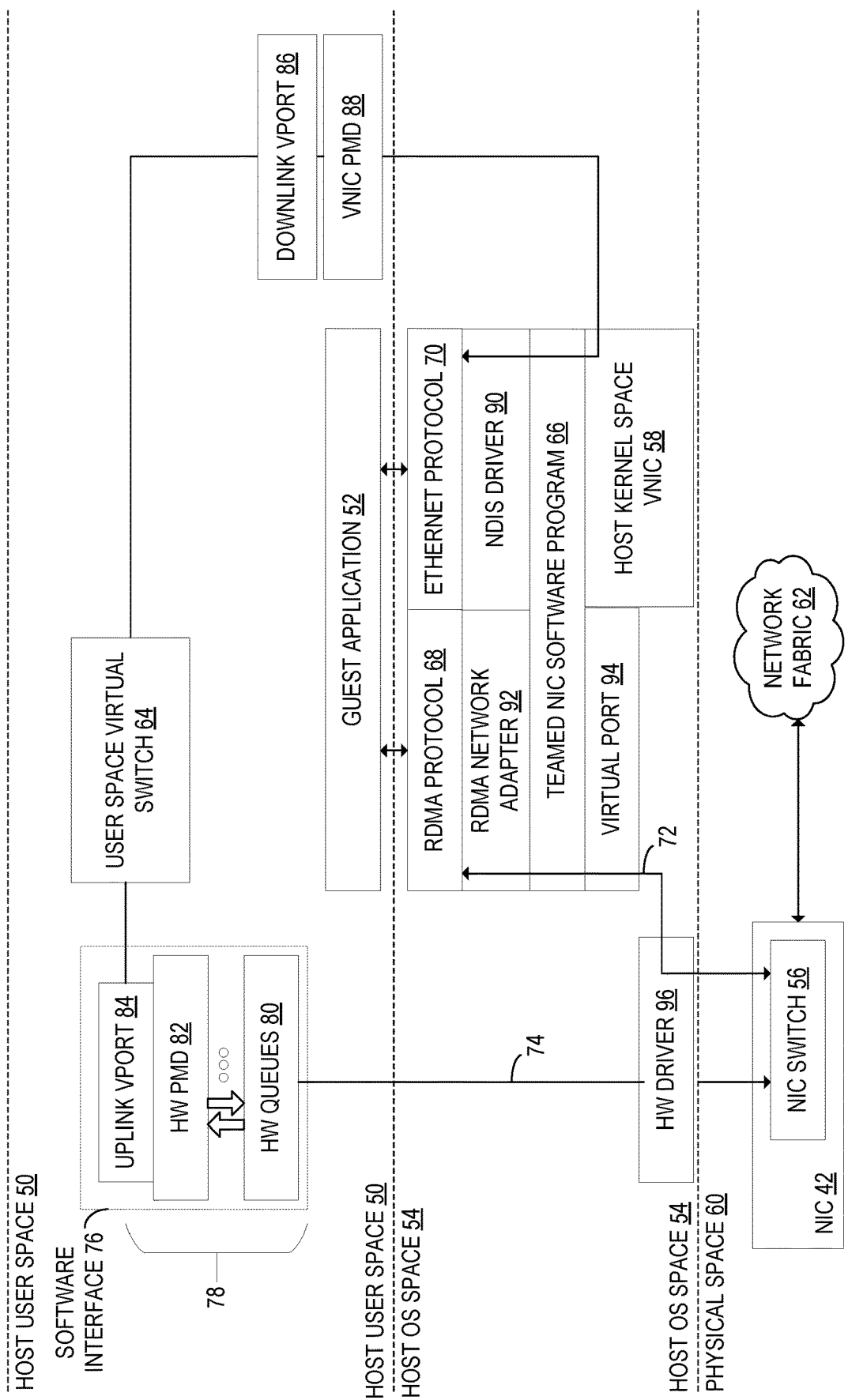
FIG. 3 is a schematic view of an example host architecture for enabling both user space network virtualization and RDMA for the host devices of FIG. 1.

FIG. 3 shows an example host architecture 48 for enabling both user space network virtualization and RDMA. The example host architecture 48 may be implemented for the host devices 24 of the computer system 10 of FIG. 1. However, it should be appreciated that the example host architecture 48 may be implemented for any suitable computer system. For example, the host architecture 48 shown in FIG. 3 and described herein may be implemented in another example computer system that includes at least one host device 24 including at least one processor 34. In some examples, the host device 24 is one of a plurality of host devices 24. The computer system may further include a network, such as the network infrastructure 20, that connects the plurality of host devices 24 via a respective plurality of physical NICs 42 of each of the host devices 24. Each of the plurality of host devices 24 may include at least one processor 34, at least one memory device 44, and at least one physical NIC 42, as shown in the example of FIG. 2.

Each of the plurality of host devices 24 are configured to execute a respective host OS 38. Each host OS 38 allocates a portion of system memory from a respective memory device 44 to a host user space 50 for guest applications 52 and a portion of system memory to a host OS space 54 for a kernel of the host OS 38. The host user space 50 is allocated for execution of programs, such as the guest applications 52, by authorized and authenticated users of the computer system 10. The host user space 50 may include the code that runs outside the operating system's kernel, and may include various programs and libraries that the host OS uses to interact with the kernel, such as, for example, software for input/output (TO), software for manipulating file system objects, etc.

The host OS space 54, which may also be referred to as the host kernel space, is allocated for a kernel of the host OS 38 for execution of threads by OS processes. The host OS space 54 is separate from the host user space and excludes application space where application software is typically executed. The kernel code of the host OS 38 may, for example, be executed under central processing unit (CPU) Protection Ring 0 in the host OS space 54, and may have access to all of the machine's instructions and system memory. In contrast, the programs and applications run in the host user space 50 may be executed under, for example, CPU Protection Ring 3, which limits access to system resources. Programs in the host user space 50 may access system resources using a set of API calls, also referred to as the system calls, that are sent to the kernel to request memory and physical hardware access. It should be appreciated that other types of memory and hardware protection architectures may be implemented to separate the applications running in host user space 50 and the OS processes run in host OS space 54.

The physical NIC 42 of the host device 24 may include a NIC switch 56, which is a physical embedded layer for performing switching on the physical NIC. The NIC switch 56 may provide functionality to create virtual ports that connect to virtual cables that are mapped to a virtual NIC, such as, for example, the host kernel space virtual NIC (vNiC) 58 that will be described in more detail below. These vNICs, such as the host kernel space vNIC 58, may be assigned a destination MAC address, and may operate in a similar manner to a physical network counterpart. The software programs and applications of the physical NIC 42, and other hardware components may operate in a physical address space 60, as shown in FIG. 3. Each physical NIC 42 may transmit communications over a network fabric 62 of the computer system 10 to interact with other physical NICs 42 and hardware components across the computer system 10.

As discussed above, moving toward user space network virtualization may provide the potential advantage of enabling high-performance, secure, and reliable packet processing. As shown in FIG. 3, to achieve user space network virtualization, a virtual switch 64 is implemented in the host user space 50. The virtual switch 64 may provide functionality for enabling virtual machines, such as the virtual machines 26 of the virtual machine plane 16, to access the capabilities of the physical NICs 42 to communicate with other virtual machines 26, applications, and other types of software using Ethernet protocols. The virtual switch 64 may communicate with the physical NIC 52, use the physical NIC 42 as an uplink, and may create virtual NICs that logically lie on top of the physical NIC 42 to provide an abstraction layer for downstream software. The virtual switch 64 may handle handshakes, exchanges, configurations, and function pointer tables for communication for the Ethernet traffic flowing through the host user space.

In conventional implementations, RDMA protocols would typically use a kernel space switch to configure associated vNICs, handshake, get function pointer tables for communication, etc. In the example shown in FIG. 3, rather than a kernel space switch, the server architecture uses user space virtualization that includes the virtual switch 64 implemented in the host user space. However, the RDMA protocols are kernel space modules that typically must stay within the host OS space to achieve suitable data security and protection requirements. Thus, the RDMA protocols are unable to use the virtual switch 64 that is implemented in the host user space for configure associated vNICs, handshaking, and other capabilities needed to perform RDMA.

As discussed above, conventional user space network virtualization implementations focus on servicing virtual machines and guests, and do not encompass storage protocols, such as RDMA. Thus, these conventional implementations are unable to provide functionality for performing both Ethernet traffic that flows through the host user space as well as RDMA accesses that flows through the host OS space.

To address this issue, the example host architecture 48 shown in FIG. 3 includes a teamed NIC software program 66 that provides functionality for enabling a user space Ethernet packet processing data pathway while simultaneously allowing for kernel space consumption of RDMA protocols. The teamed NIC software program 66 is configured to provide a unified interface to host OS space 54 upper layer protocols. These upper layer protocols include at least an RDMA protocol 68 and an Ethernet protocol 70. To provide the unified interface, the teamed NIC software program 66 provides multiplexing for at least two data pathways including an RDMA data pathway 72 and an Ethernet data pathway 74. As shown in FIG. 3, RDMA data pathway 72 transmits communications to and from an RDMA interface of a physical NIC 42 through the host OS space 54. On the other hand, the Ethernet data pathway transmits communications to and from an Ethernet interface of the physical NIC 42 through the virtual switch 64 that is implemented in the host user space 50 and a host kernel space virtual NIC 58 that is implemented in the host OS space 54. The RDMA interface and Ethernet interface described herein refers to the drivers, adapters, and other software and hardware constructs of the physical NIC 42. These two data pathways will be described in more detail below.

In one example, the unified interface provided to the host OS space upper layer protocols by the teamed NIC software program 66 includes a single unified media access control (MAC) address and internet protocol (IP) address that is used to transmit data with the physical NIC 42. That is, the kernel space applications running the host OS space 54 managing the RDMA protocol 68 and the Ethernet protocol 70 may use the same MAC address and IP address when transmitting data for both RDMA and Ethernet traffic. Further, the teamed NIC software program 66 aggregates data traffic from both the RDMA data pathway 72 and the Ethernet data pathway 74, and provides the aggregated traffic to the host OS space upper layer protocols through the unified interface. In this manner, the aggregated traffic appears to the upper layer protocols to be originating from a same device. The upper layer protocols, such as the RDMA protocol 68 and the Ethernet protocol 70 are unaware that the data from the RDMA data pathway 72 and the data from the Ethernet data pathway 74 are being aggregated, and only sees that the data is being transmitted using the same MAC address and IP address of the unified interface presented by the teamed NIC software program 66. Thus, these upper layer protocols are unaware that the virtual switch 64 is not co-located with the TCP/IP stack, and are unaware that the Ethernet traffic is being routed through the host user space 50. This data transport architecture provides the benefit of enabling a user space Ethernet packet processing data pathway while simultaneously allowing for kernel space consumption of RDMA protocols.

Figure 4:
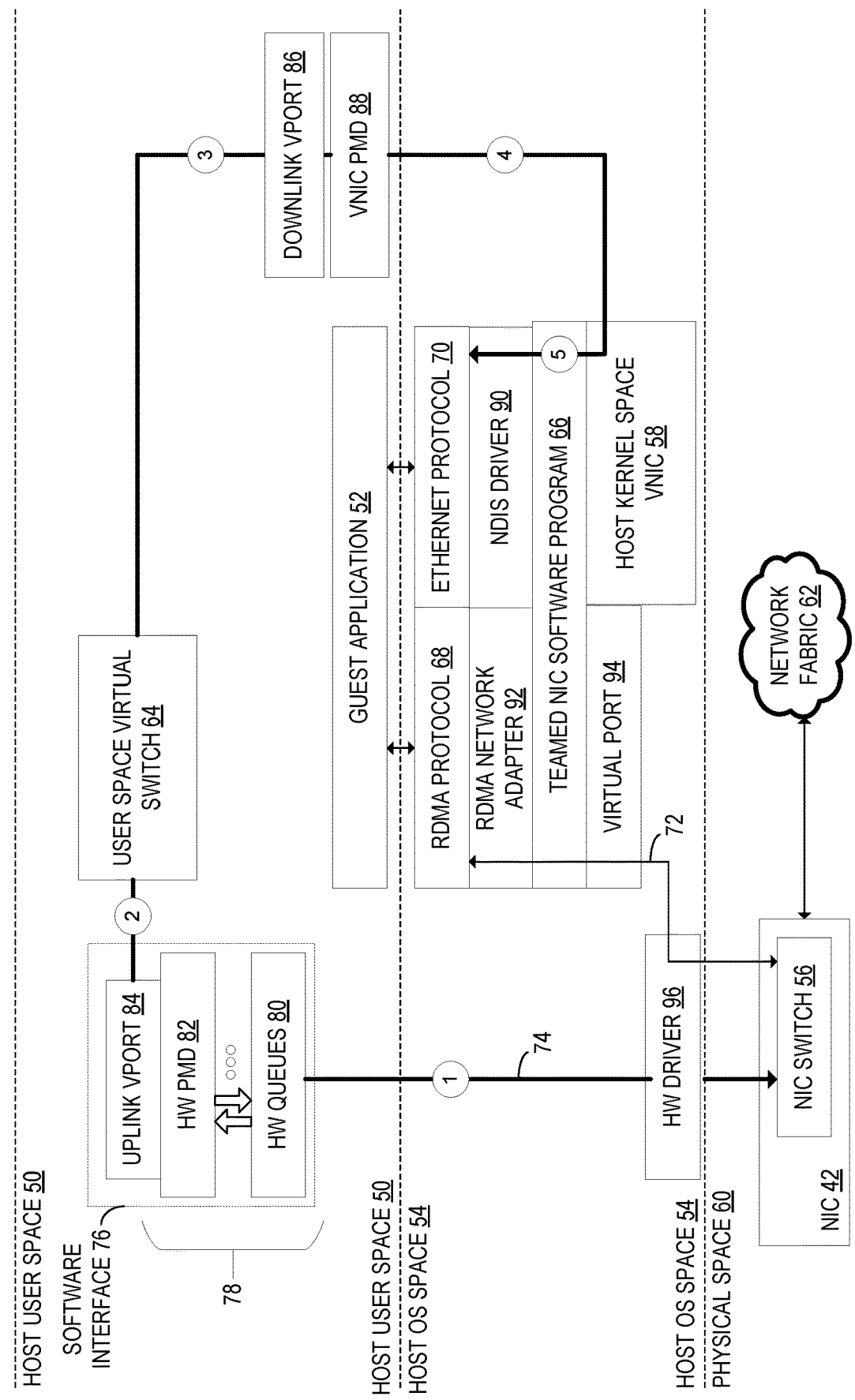
FIG. 4 shows an Ethernet data pathway for a teamed NIC software program of the example host architecture of FIG. 3.

Turning to FIG. 4, the Ethernet data pathway 74 flows through the host user space 50 via several components. To provide access to the physical NIC 42, a software interface 76 for the NIC switch 56 of the physical NIC 42 is run in the host user space 50. The software interface 76 implements queues and resources 78 for transmitting data to and from the physical NIC 42. The software interface 76 may includes multiple transmit and receive queues 80, allotting packets received by the physical NIC 42 to be assigned to one of the queues. The queues and resources 78 may also include a hardware poll mode driver associated with the physical NIC 42, and multiple uplink virtual ports 84 that are used to route traffic to corresponding downlink virtual ports 86. It should be appreciated that the software interface 76 for the physical NIC 42 may implement other software constructs not specifically described herein.

As illustrated in FIG. 4, the virtual switch 64 transmits data packets to and from the NIC switch 42 using the software interface 76 implemented in the host user space 50. For example, the virtual switch 64 may be communicatively coupled to the uplink virtual ports 84 of the software interface 76. The virtual switch 64 may provide capabilities handling handshakes, exchanges, and configurations for the data traffic. Further, the virtual switch 64 may be configured to create and manage virtual NICs that will logically lie on top of the physical NIC 42, and manages the function pointer tables for communication using those virtual NICs. Communication using these virtual NICs may be routed using the uplink virtual ports 84 and downlink virtual ports 86. These virtual NICs may be used to route traffic between virtual machines 26 running in the virtual machine plane 16. Additionally, these virtual NICs managed by the virtual switch 64 include the host kernel space virtual NIC 58 that lies under the teamed NIC software program 66.

In this manner, Ethernet traffic may be routed to the host kernel space virtual NIC 58 through the host user space 50 via the uplink virtual port 84 and downlink virtual port 86 associated with the host kernel space virtual NIC 58. As illustrated in FIG. 4, the virtual switch 64 may be configured to transmit data packets to and from the virtual NIC 58 implemented in the host OS space 54 using a shared memory communication between the host user space 50 and the user OS space 54. The shared memory communication between the host user space 50 and the host OS space 54 may be controlled by a poll mode driver (PMD) 88 implemented in the host user space 50. The PMD 88 may use shared memory queues to transmit and receive data with the host kernel space virtual NIC 58 associated with the downlink virtual port 86.

Using the software and hardware components described above, the Ethernet data pathway 74 includes steps (1)-(5). At (1), transmitting communications between the Ethernet interface of the physical NIC 42 and a software interface 76 implemented in the host user space 50 for the physical NIC 42. At (2), transmitting communications between the software interface 76 of the physical NIC 42 and the virtual switch 64 implemented in the host user space 50. At (3) transmitting communications between the virtual switch 64 and the PMD 88 configured for shared memory communication between the host user space 50 and the host OS space 54. At (4) transmitting communications between the PMD 88 and the virtual NIC 58 implemented in the host OS space 54. At (5) transmitting communications between the virtual NIC 58 and the teamed NIC software program 66. A network driver interface specification (NDIS) driver 90 may be used to logically link the teamed NIC software program 66 with the upper layer Ethernet protocol. The NDIS driver 90 specifies a standard interface between layered network drivers, thereby abstracting lower-level drivers that manage hardware from upper level drivers, such as network transports.

Figure 5:
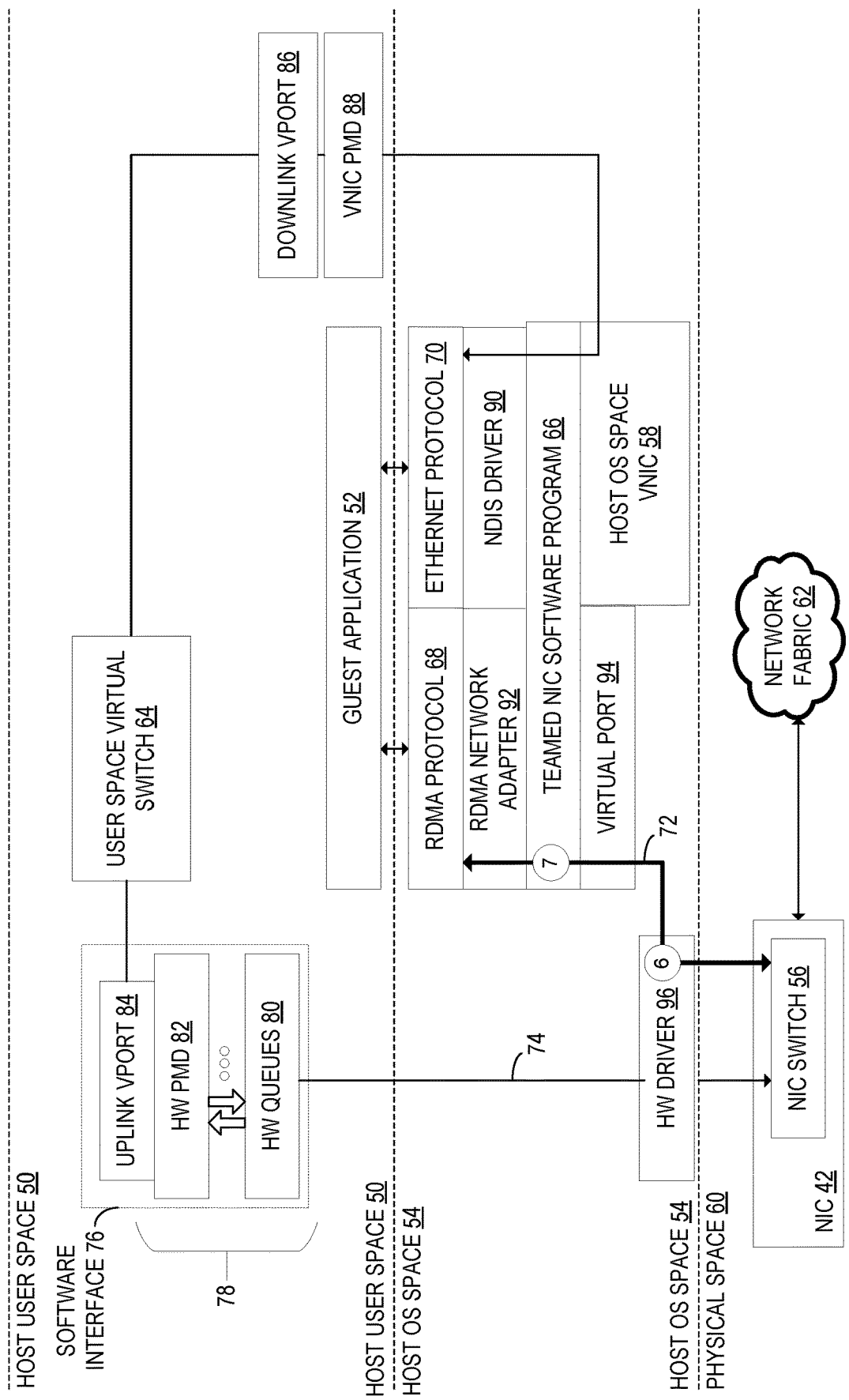
FIG. 5 shows an RDMA data pathway for a teamed MC software program of the example host architecture of FIG. 3.

Turning to FIG. 5, the RDMA data pathway 72 flows through the host OS space 54, and does not flow through the host user space 50 like the Ethernet data pathway 74. As discussed previously, the RDMA protocol 68 typically goes through a host OS space virtual switch for handshaking and getting function pointer tables for communication. However, in this example, the virtual switch 64 resides in the host user space 50. Thus, instead of using the virtual switch 64, the RDMA protocol 68 will access RDMA capabilities of the physical NIC 42 through the teamed NIC software program 66. The teamed NIC software program 66 may be configured to access an RDMA interface of the physical NIC 42 through direct access to a virtual port 84 of the physical NIC 42 using a hardware driver 96. The hardware driver 96 of the physical NIC 42 may provide functionality for managing the physical NIC 42, including sending and receiving data through the physical NIC. The hardware driver 96 may also provide functionality for interfacing with higher-level drivers, such as the RDMA protocol 68. Through the virtual port 94 and the hardware driver 96 of the physical NIC 42, the teamed NIC software program 66 may use a MAC and IP address assignment for the RDMA interface of the physical NIC 42 for the RDMA data pathway 72. Using the RDMA data pathway 72, the RDMA protocol 68 may be used to directly read or write to a memory device without being processed by a host OS of the computer system 10.

The hardware driver 96 of the physical NIC 42 may implement an RDMA network adapter 92 to provide the RDMA functionality of the physical NIC 42. As a specific example, the RDMA network adapter 92 may take the form of a Network Direct Kernel Provider Interface (NDKPI) that provides an interface for kernel-mode RDMA support. As illustrated in FIG. 5, the RDMA network adapter 92 may be used by the teamed NIC software program 66 to expose the RDMA functionality of the physical NIC 42.

As shown in FIG. 5, the RDMA data pathway 72 may include, at (6), accessing the RDMA interface of the physical NIC 42 through using the hardware driver 86, and at (7), transmitting communications between the RDMA interface of the physical NIC 42 and the teamed NIC software program 66. The teamed NIC software program 66 may aggregate the traffic from the Ethernet data pathway 74 with any RDMA processes for the RDMA pathway 72, and present a unified interface to the upper layer protocols such as the RDMA protocol 68 and the Ethernet protocol 70. The RDMA protocol 68 and the Ethernet protocol 70 are peer protocols expecting to communicate with the same device. These upper layer protocols may in turn communicate with an agent in the host user space 50, such as, for example, a guest application being run in the host user space 50. The upper layer protocols may service the guest applications through specific OS requests and API calls.

Figure 6:
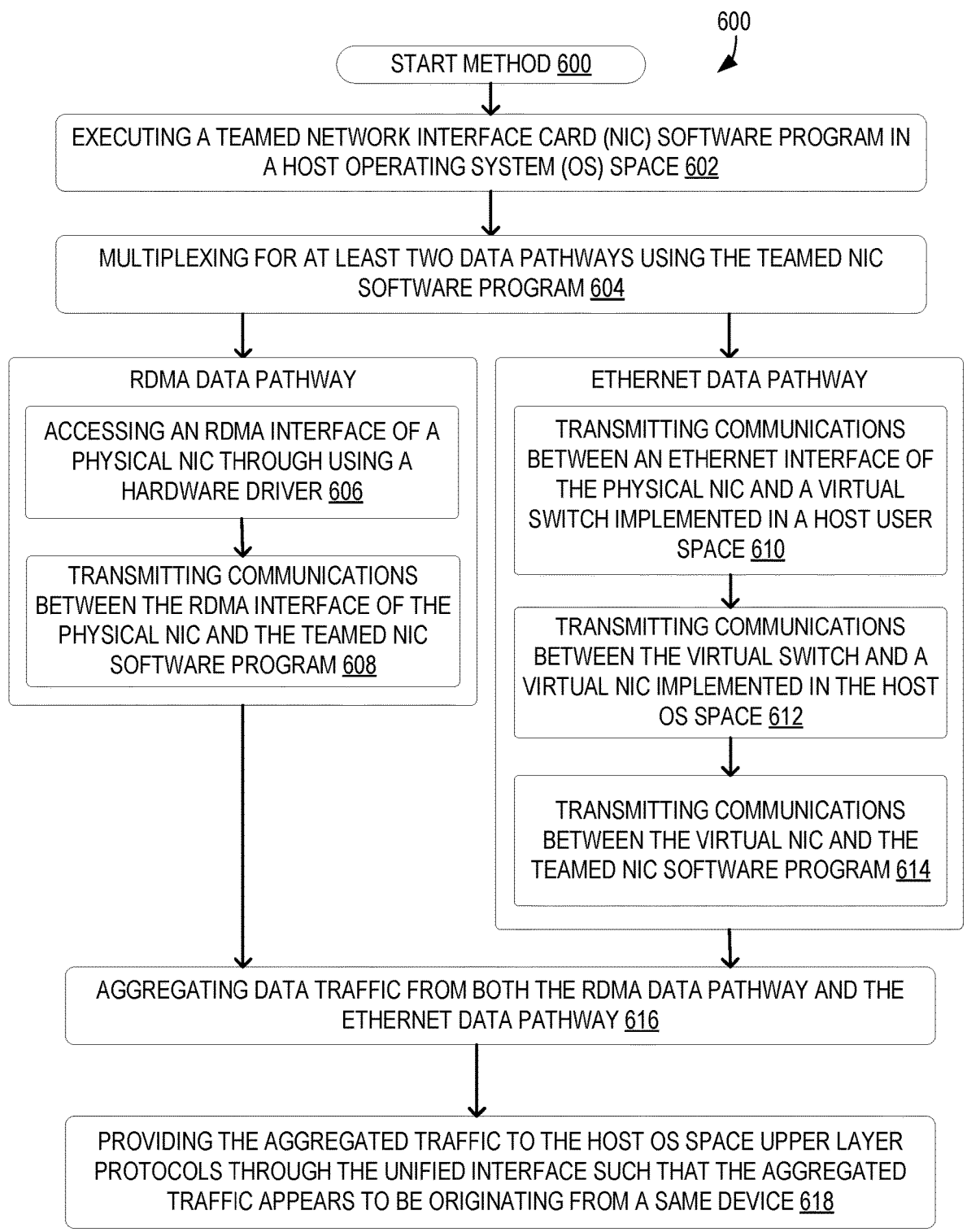
FIG. 6 shows a flowchart of an example method for enabling both user space network virtualization and RDMA, according to one embodiment of the subject disclosure.

FIG. 6 shows a flowchart for an example method 600 for enabling both user space network virtualization and RDMA processes. The method 600 may be implemented by each host device 24 of the computer system 10 shown in FIG. 1, or by another example computer system for hosting a cloud platform.

At 602, the method 600 may include executing a teamed network interface card (NIC) software program in a host operating system (OS) space. Executing the teamed NIC software program may include providing a unified interface to host OS space upper layer protocols including at least a remote direct memory access (RDMA) protocol and an Ethernet protocol. The RDMA protocol and the Ethernet protocol are peer protocols that expect to lie above the same device. The unified interface provided to the host OS space upper layer protocols by the teamed NIC software program may include a single unified media access control (MAC) address and internet protocol (IP) address that is used to transmit data with the physical NIC. Thus, from the perspective of the upper layer protocols, a single device is sending and receiving data traffic for both RDMA processes and Ethernet traffic.

At 604, the method 600 may include multiplexing for at least two data pathways using the teamed NIC software program. The two data pathways include at least an RDMA data pathway and an ethernet data pathway. The RDMA data pathway is implement in the host OS space. The Ethernet data pathway flows through the host user space.

The RDMA data pathway includes steps 606 and 608 of the method 600. At 606, the method 600 may include accessing an RDMA interface of a physical NIC through using a hardware driver. Step 606 may correspond to step (6) shown in FIG. 5. At 608, the method 600 may include transmitting communications between the RDMA interface of the physical NIC and the teamed NIC software program. Step 608 may correspond to step (7) shown in FIG. 5.

The Ethernet data pathway includes steps 610-614. At 610, the method 600 may include transmitting communications between an Ethernet interface of the physical NIC and a virtual switch implemented in a host user space. In some examples, step 610 may include sub-steps corresponding to steps (1) and (2) shown in FIG. 4, and may include transmitting communications between the Ethernet interface of the physical NIC and a software interface implemented in the host user space for the physical NIC, and transmitting communications between the software interface of the physical NIC and the virtual switch implemented in the host user space.

At 612, the method 600 may include transmitting communications between the virtual switch and a virtual NIC implemented in the host OS space. In some examples, step 612 may include sub-steps corresponding to steps (3) and (4) shown in FIG. 4, and may include transmitting communications between the virtual switch and a poll mode driver configured for shared memory communication between the host user space and the host OS space, and transmitting communications between the poll mode driver and the virtual NIC implemented in the host OS space.

At 614, the method 600 may include transmitting communications between the virtual NIC and the teamed NIC software program, which may correspond to step (5) shown in FIG. 4.

At 616, the method 600 may include aggregating data traffic from both the RDMA data pathway and the Ethernet data pathway.

At 618, the method 600 may include providing the aggregated traffic to the host OS space upper layer protocols through the unified interface such that the aggregated traffic appears to be originating from a same device.

In this manner, the method and systems described above may provide the potential benefit of enabling both user space network virtualization and RDMA processes that does not need to co-locate the Ethernet device with the TCP/IP stack, thus allowing for a user space Ethernet packet processing data path while simultaneously allowing for OS space consumption of RDMA protocols. By providing both of these data paths, the method and systems described above may achieve the potential benefits of user space network virtualization of high-performance, secure, and reliable packet processing for modern datacenter workloads, while simultaneously enabling RDMA which provides the potential benefits of low latency transfer of information between compute nodes at the memory-to-memory level, without burdening the CPU.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
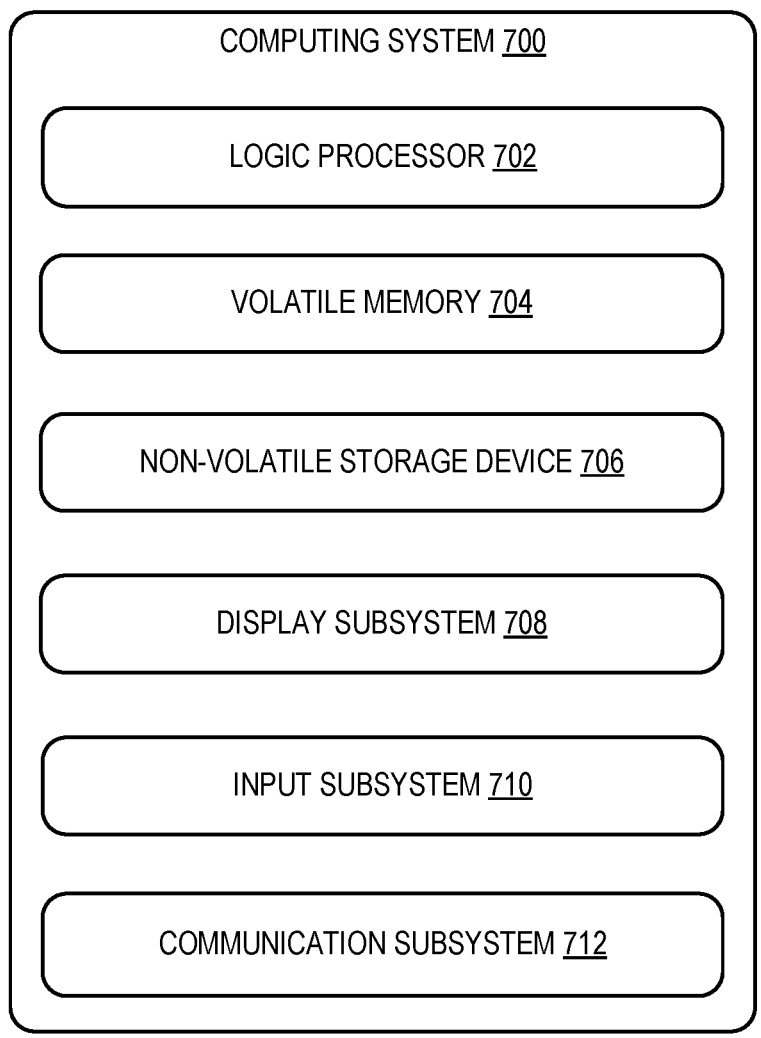
FIG. 7 shows a schematic view of an example computing environment in which the host device of the computer system of FIG. 1 may be enacted.

FIG. 7 schematically shows a non-limiting embodiment of a computing system 700 that can enact one or more of the methods and processes described above. Computing system 700 is shown in simplified form. Computing system 700 may embody one or more of the host devices 24 of the computer system 10 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computer system comprising at least one host device comprising at least one processor. The at least one processor is configured to implement, in a host operating system (OS) space, a teamed network interface card (NIC) software program that provides a unified interface to host OS space upper layer protocols including at least a remote direct memory access (RDMA) protocol and an Ethernet protocol. The teamed NIC software program provides multiplexing for at least two data pathways including an RDMA data pathway that transmits communications to and from an RDMA interface of a physical NIC. The RDMA data pathway being within the host OS space. The at least two data pathways include an Ethernet data pathway that transmits communications to and from an Ethernet interface of the physical NIC through a virtual switch that is implemented in a host user space and a virtual NIC that is implemented in the host OS space.

In this aspect, additionally or alternatively, the at least one processor may be configured to implement, in a host user space, a software interface for a NIC switch of the physical NIC, and the virtual switch that transmits data packets to and from the NIC switch using the software interface implemented in the host user space. In this aspect, additionally or alternatively, the software interface implemented in host user space for the NIC switch of the physical NIC may include queues and resources for transmitting data to and from the physical NIC. In this aspect, additionally or alternatively, the virtual switch may transmit data packets to and from the virtual NIC implemented in the host OS space using a shared memory communication between the host user space and the user OS space. In this aspect, additionally or alternatively, the shared memory communication between the host user space and the host OS space may be controlled by a poll mode driver implemented in the host user space. In this aspect, additionally or alternatively, the Ethernet data pathway may transmit communications between the Ethernet interface of the physical NIC and the teamed NIC software program through the software interface for the NIC switch of the physical NIC, the virtual switch implemented in the host user space, the shared memory communication between the host user space and the host OS space, and the virtual NIC that is implemented in the host OS space.

In this aspect, additionally or alternatively, the RDMA data pathway may use a media access control (MAC) address and an internet protocol (IP) address assignment for the RDMA interface of the physical NIC. In this aspect, additionally or alternatively, the teamed NIC software program may access the RDMA interface of the physical NIC through direct access to a virtual port of the physical NIC using a hardware driver. In this aspect, additionally or alternatively, the RDMA protocol may be used to directly read or write to a memory device without being processed by a host OS of the computer system. In this aspect, additionally or alternatively, the unified interface provided to the host OS space upper layer protocols by the teamed NIC software program may include a single unified media access control (MAC) address and internet protocol (IP) address that is used to transmit data with the physical NIC. In this aspect, additionally or alternatively, the teamed NIC software program may aggregate data traffic from both the RDMA data pathway and the Ethernet data pathway, and may provide the aggregated traffic to the host OS space upper layer protocols through the unified interface such that the aggregated traffic appears to be originating from a same device.

In this aspect, additionally or alternatively, the host device may be one of a plurality of host devices, and0 the computer system may further comprise a network that connects the plurality of host devices via a respective plurality of physical NICs of each of the host devices. Each of the plurality of host devices may include at least one processor, at least one memory device, and at least one physical NIC. Each of the plurality of host devices may be configured to execute a respective host operating system that allocates a portion of system memory from a respective memory device to a host user space for guest applications and a portion of system memory to a host OS space for a kernel of the host operating system. In this aspect, additionally or alternatively, the host user space may be allocated for execution of programs by authorized and authenticated users of the computer system, and the host OS space may be allocated for a kernel of the host OS for execution of threads by OS processes.

Another aspect provides a method comprising, at a processor of a host device, executing a teamed network interface card (NIC) software program in a host operating system (OS) space, wherein the teamed NIC software program includes providing a unified interface to host OS space upper layer protocols including at least a remote direct memory access (RDMA) protocol and an Ethernet protocol. The method may further comprise multiplexing for at least two data pathways using the teamed NIC software program. The at least two data pathways include an RDMA data pathway implemented in the host OS space that includes accessing an RDMA interface of a physical NIC through using a hardware driver, and transmitting communications between the RDMA interface of the physical NIC and the teamed NIC software program. The at least two data pathways include an Ethernet data pathway that includes transmitting communications between an Ethernet interface of the physical NIC and a virtual switch implemented in a host user space, transmitting communications between the virtual switch and a virtual NIC implemented in the host OS space, and transmitting communications between the virtual NIC and the teamed NIC software program.

In this aspect, additionally or alternatively, transmitting communications between the Ethernet interface of the physical NIC and the virtual switch implemented in a host user space may further include transmitting communications between the Ethernet interface of the physical NIC and a software interface implemented in the host user space for the physical NIC, and transmitting communications between the software interface of the physical NIC and the virtual switch implemented in the host user space. In this aspect, additionally or alternatively, transmitting communications between the virtual switch and the virtual NIC implemented in the host OS space may further include transmitting communications between the virtual switch and a poll mode driver configured for shared memory communication between the host user space and the host OS space, and transmitting communications between the poll mode driver and the virtual NIC implemented in the host OS space.

In this aspect, additionally or alternatively, the unified interface provided to the host OS space upper layer protocols by the teamed NIC software program may include a single unified media access control (MAC) address and internet protocol (IP) address that is used to transmit data with the physical NIC. In this aspect, additionally or alternatively, executing the teamed NIC software program may include aggregating data traffic from both the RDMA data pathway and the Ethernet data pathway, and providing the aggregated traffic to the host OS space upper layer protocols through the unified interface such that the aggregated traffic appears to be originating from a same device. In this aspect, additionally or alternatively, transmitting communications between the RDMA interface of the physical NIC and the teamed MC software program may include directly reading or writing to a memory device without being processed by a host OS.

Another aspect provides a computer system comprising at least one host device comprising at least one processor and at least one physical network interface card (NIC), the at least one processor being configured to execute a virtual switch in a host user space, the virtual switch being configured to transmit data packets to and from the physical NIC through the user space, execute a teamed NIC software program in a host operating system (OS) space, the teaming NIC software program being configured to provide a unified interface to host OS space upper layer protocols including at least a remote direct memory access (RDMA) protocol and an Ethernet protocol, transmit communications to and from an RDMA interface of the physical NIC and the teamed NIC software program using an RDMA data pathway that flows through the host OS space, transmit communications to and from an Ethernet interface of the physical NIC through the virtual switch that is implemented in a host user space and a virtual NIC that is implemented in the host OS space using an Ethernet data pathway that flows through the host user space, aggregate data traffic for at least the RDMA data pathway and the Ethernet data pathway, and provide the aggregated data traffic to the RDMA protocol and the Ethernet protocol using the unified interface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A host device comprising at least one processor configured to implement, in a host operating system (OS) space, a teamed network interface card (NIC) software program that provides a unified interface to host OS space upper layer protocols that serve applications executing in a host user space, the host OS space upper layer protocols including at least a remote direct memory access (RDMA) protocol and an Ethernet protocol, wherein the teamed NIC software program provides multiplexing for at least two data pathways between a physical NIC and the host OS space upper layer protocols, the at least two data pathways including:
an RDMA data pathway that transmits first communications between an RDMA interface of the physical NIC and the teamed NIC software program through the host OS space and not through the host user space; and
an Ethernet data pathway that transmits second communications between an Ethernet interface of the physical NIC and the teamed NIC software program through both a virtual switch that is implemented in the host user space and a virtual NIC that is implemented in the host OS space.

2. The host device of claim 1, wherein the at least one processor is configured to implement, in the host user space:
a software interface for a NIC switch of the physical NIC; and
the virtual switch that transmits a data packet to or from the NIC switch using the software interface implemented in the host user space.

3. The host device of claim 2, wherein the software interface for the NIC switch of the physical NIC includes queues and resources for transmitting the data packet.

4. The host device of claim 2, wherein the virtual switch transmits the data packet to or from the NIC switch using a shared memory communication between the host user space and the host OS space.

5. The host device of claim 4, wherein the shared memory communication between the host user space and the host OS space is controlled by a poll mode driver implemented in the host user space.

6. The host device of claim 2, wherein the Ethernet data pathway transmits the second communications between the Ethernet interface of the physical NIC and the teamed NIC software program through the software interface for the NIC switch of the physical NIC, the virtual switch implemented in the host user space, a shared memory communication between the host user space and the host OS space, and the virtual NIC that is implemented in the host OS space.

7. The host device of claim 1, wherein the RDMA data pathway uses a media access control (MAC) address and an internet protocol (IP) address assignment for the RDMA interface of the physical NIC.

8. The host device of claim 7, wherein the teamed NIC software program accesses the RDMA interface of the physical NIC through direct access to a virtual port of the physical NIC using a hardware driver.

9. The host device of claim 1, wherein the RDMA protocol is used to directly read or write to a memory device without being processed by a host OS of the host device.

10. The host device of claim 1, wherein the unified interface provided to the host OS space upper layer protocols that serve applications executing in the host user space, by the teamed NIC software program includes a single unified media access control (MAC) address and internet protocol (IP) address that is used to transmit data with the physical NIC.

11. The host device of claim 10, wherein the teamed NIC software program aggregates data traffic from both the RDMA data pathway and the Ethernet data pathway and provides the data traffic to the host OS space upper layer protocols that serve the applications executing in the host user space through the unified interface such that the data traffic appears to be originating from a same device.

12. The host device of claim 1, wherein:
the host user space is allocated for execution of programs by authorized and authenticated users; and
the host OS space is allocated for a kernel of a host OS for execution of threads by OS processes.

13. A method comprising:
executing a teamed network interface card (NIC) software program in a host operating system (OS) space, wherein the teamed NIC software program provides a unified interface to host OS space upper layer protocols that serve applications executing in a host user space, the host OS space upper layer protocols including at least a remote direct memory access (RDMA) protocol and an Ethernet protocol;
multiplexing for at least two data pathways between a physical NIC and the host OS space upper layer protocols using the teamed NIC software program, the at least two data pathways including:
an RDMA data pathway implemented in the host OS space that includes:
accessing an RDMA interface of the physical NIC through using a hardware driver; and
transmitting first communications between the RDMA interface of the physical NIC and the teamed NIC software program through the host OS space and not through the host user space;
an Ethernet data pathway that includes transmitting second communications between an Ethernet interface of the physical NIC and the teamed NIC software program through both a virtual switch that is implemented in the host user space and a virtual NIC that is implemented in the host OS space.

14. The method of claim 13, wherein transmitting the second communications between the Ethernet interface of the physical NIC and the teamed NIC software program through both the virtual switch that is implemented in the host user space and the virtual NIC that is implemented in the host OS space, further includes:

transmitting the second communications between the Ethernet interface of the physical NIC and a software interface implemented in the host user space for the physical NIC; and transmitting the second communications between the software interface and the virtual switch that is implemented in the host user space.

15. The method of claim 13, wherein the unified interface provided to the host OS space upper layer protocols that serve the applications executing in the host user space by the teamed NIC software program includes a single unified media access control (MAC) address and internet protocol (IP) address that is used to transmit data packets with the physical NIC.

16. The method of claim 13, wherein executing the teamed NIC software program includes:

aggregating data traffic from both the RDMA data pathway and the Ethernet data pathway; and providing the data traffic to the host OS space upper layer protocols that serve the applications executing in the host user space through the unified interface such that the data traffic appears to be originating from a same device.

17. The method of claim 16, wherein transmitting the first communications between the RDMA interface of the physical NIC and the teamed NIC software program includes directly reading or writing to a memory device without being processed by a host OS.

18. A host device comprising at least one processor and at least one physical network interface card (NIC), the at least one processor being configured to:

execute a virtual switch in a host user space, the virtual switch being configured to transmit data packets to and from the physical NIC through the host user space;

execute a teamed NIC software program in a host operating system (OS) space, wherein the teamed NIC software program is configured to provide a unified interface to host OS space upper layer protocols that serve applications executing in the host user space, the host OS space upper layer protocols including at least a remote direct memory access (RDMA) protocol and an Ethernet protocol;

transmit first communications to and from an RDMA interface of the physical NIC and the teamed NIC software program using an RDMA data pathway that flows between the physical NIC and the host OS space upper layer protocols;

transmit second communications to and from an Ethernet interface of the physical NIC through the virtual switch that is executed in the host user space and a virtual NIC that is executed in the host OS space using an Ethernet data pathway that flows between the physical NIC and the host OS space upper layer protocols;

aggregate data traffic for at least the RDMA data pathway and the Ethernet data pathway; and provide the data traffic to the RDMA protocol and the Ethernet protocol using the unified interface, wherein the data traffic is provided to the host OS space upper layer protocols that serve the applications executing in the host user space using the unified interface such that the data traffic appears to be originating from a same device.

19. The host device of claim 18, wherein the unified interface provided to the host OS space upper layer protocols that serve the applications executing in the host user space by the teamed NIC software program includes a single unified media access control (MAC) address and internet protocol (IP) address that is used to transmit data with the physical NIC.

* * * * *